United States Patent
Hill

[11] Patent Number: 5,955,808
[45] Date of Patent: Sep. 21, 1999

[54] MULTI-PHASE ELECTRIC MACHINE WITH OFFSET MULTI-POLAR ELECTRIC POLE UNITS

[76] Inventor: Wolfgang Hill, Ortenbergstrasse 3, 76135, Karlsruhe, Germany

[21] Appl. No.: 08/509,726

[22] Filed: Aug. 1, 1995

Related U.S. Application Data

[63] Continuation of application No. PCT/DE94/00090, Jan. 31, 1994, abandoned.

[51] Int. Cl.$^6$ .................................................. H02K 3/04
[52] U.S. Cl. ......................... 310/180; 310/201; 310/266; 310/268
[58] Field of Search .................................... 310/180, 182, 310/184, 216, 198, 200, 264, 266, 265, 267, 268

[56] References Cited

U.S. PATENT DOCUMENTS

| | | | |
|---|---|---|---|
| 3,858,071 | 12/1974 | Griffing et al. | 310/266 |
| 4,319,152 | 3/1982 | Van Gils | 310/201 |
| 4,500,827 | 2/1985 | Merritt et al. | 322/3 |
| 4,859,890 | 8/1989 | Sedgewick | 310/208 |
| 5,168,187 | 12/1992 | Baer et al. | 310/49 R |
| 5,334,899 | 8/1994 | Skybyk | 310/268 |

Primary Examiner—Thomas M. Dougherty
Assistant Examiner—Tran N. Nguyen

[57] ABSTRACT

Known multi-phase electric machines have conductor lanes which do not sufficiently utilize the space available in the grooves and winding overhang or which are costly to produce. Besides a good utilization of the available space, the length of the conductors in the winding overhangs should be kept short in order to obtain high effiency and power densities, and the number of different conductor designs should be minimized in order to reduce production costs. According to the invention, the electric machine consists of several electric pole units which have each a small number of phases and poles with alternating polarity in the direction of displacement. The electric pole units are located next to each other in the air gap and are mutually offset by a fraction of a pole pitch with respect to the rotor poles. Their meandering rectangular conductor wires extend in layers parallel to the air gap. In monophase electric pole units, the conductor insulation is designed for only a fraction of the terminal voltage; by small increments a high effective conductor proportion is achieved. The modular design allows electric machines to be assembled from a few different structural shapes which, because of their simple design, may be produced on a large scale in a totally automated manner.

8 Claims, 8 Drawing Sheets

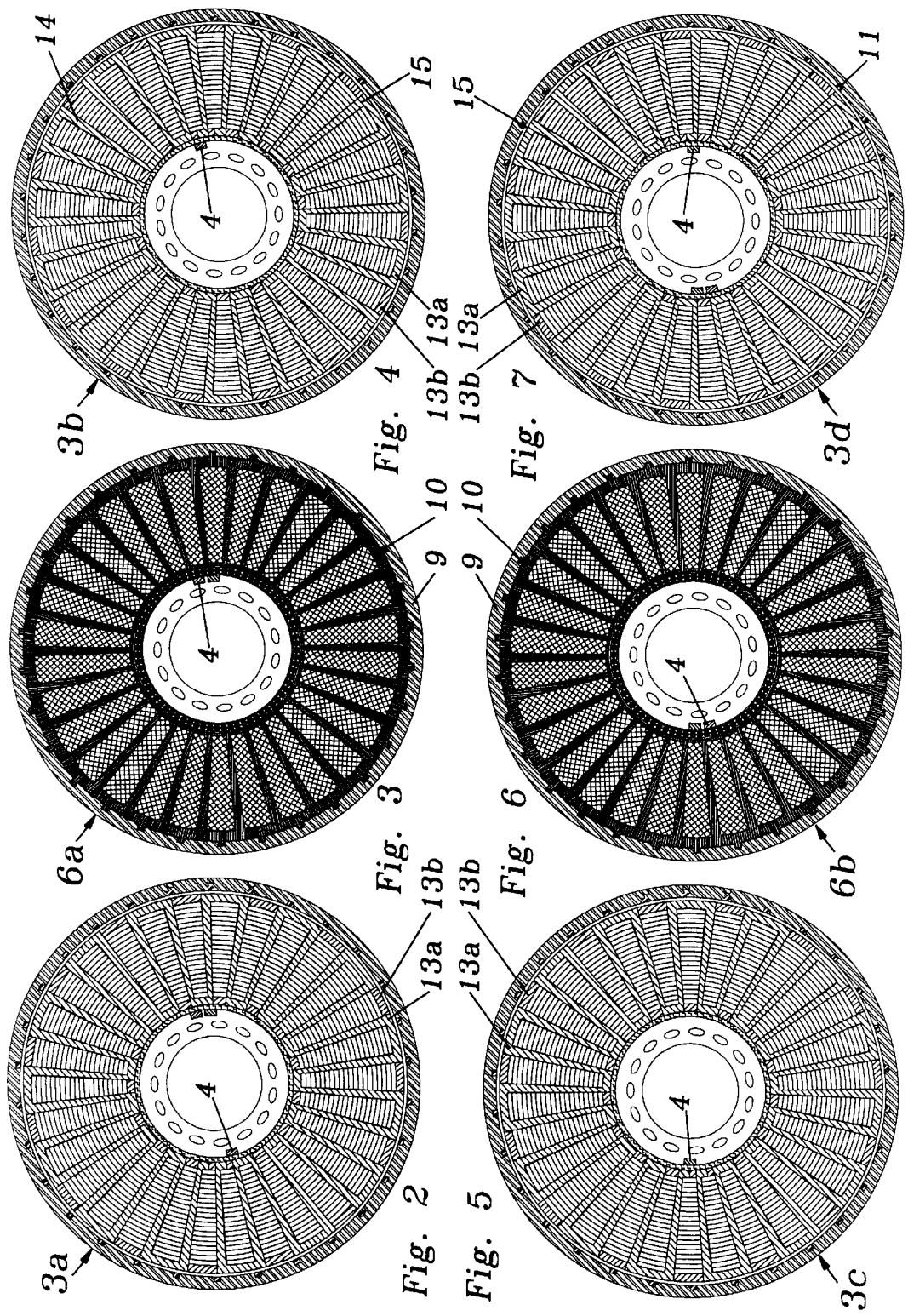

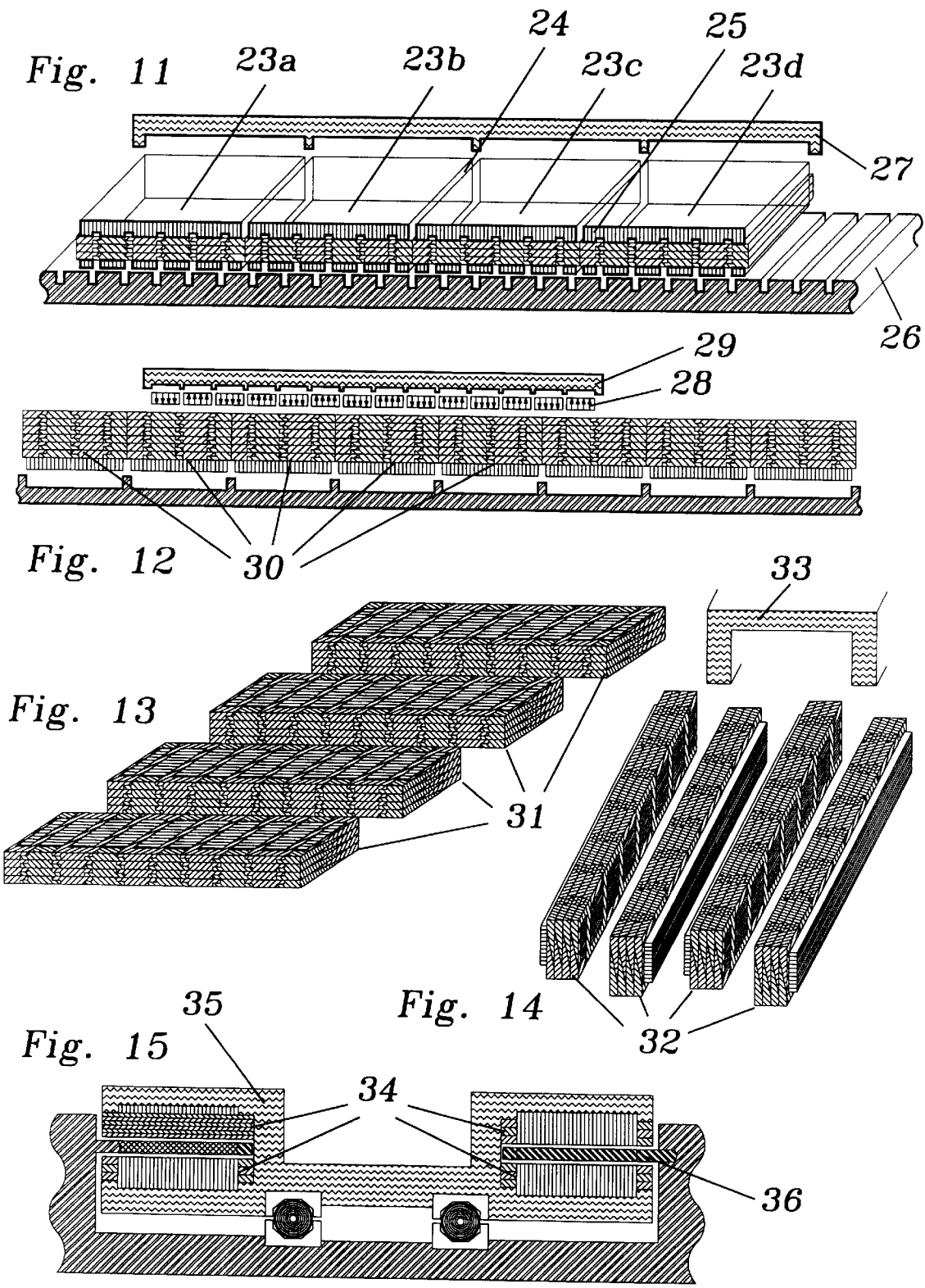

MULTI-PHASE ELECTRIC MACHINE WITH OFFSET MULTI-POLAR ELECTRIC POLE UNITS

This is a continuation of International Application PCT/DE94/00090, with an international filing date of Jan. 31, 1994, now abandoned.

BACKGROUND OF THE INVENTION

1. Field of the Invention

The invention concerns a multi-phase electric machine as well as a production process for such a machine.

2. Description of the Prior Art

In the production of multi-phase electric machines which are operated at high currents and voltages, the insulation of intersecting conductor lanes requires increased manufacturing expenditures. In order to attain high efficiency and power densities, the proportion of the conductor in relation to the groove volume should be as large as possible and the proportion of the conductor length in the winding overhang should be as small as possible.

U.S. Pat. No. 4,398,112 describes a layered winding for disk armatures and linear motors in which stamped conductor layers are inserted into the grooves from the air gap in direction of the groove depth. This results in very short lengths of all conductor lanes in the winding as described in said patent document, however, because all conductor lengths of different phases have different distances to the air gap, the groove volume is completely utilized only in single-phase machines. Single-phase machines, however, show strong variations of torque. In two-phase machines with windings in accordance with the said United States patent document the utilization factor of the grooves would already drop to 50%, and in three-phase machines to 33%.

The invention is based on the objective to advance the development of a multi-phase electric machine and a manufacturing process of this machine in such a manner that with low manufacturing expenditures high efficiency and power densities with concurrent low ohmic losses are achieved, as well as material-saving, easily automated and, therefore, cost-effective production is made possible.

SUMMARY OF THE INVENTION

In accordance with the invention, this objective is achieved by a multi-phase electric machine which is characterized by several multi-polar electric pole units, the number of phases of said units equaling a fraction of the number of phases of the entire machine; poles of the electric pole units which show alternating polarity in the direction of movement; the magnetic flux flowing in the electric pole units through soft-magnetic material; conductor lanes which progress in layers parallel to the air gap and in meander pattern in the direction of movement over the entire length of the respective electric pole units; a rectangular cross section of the conductors within the electric pole units; a constant pole pitch within each electric pole unit; a constant pole pitch of the rotor or stator over the entire circumference or length of the machine, said rotor or stator lying opposite the electric pole units at the air gap; some of the rigidly connected electric pole units being offset against each other by a fraction of a pole pitch with reference to the rotor or stator poles which lie opposite said electric pole units; the electric pole units being arranged successively in either the direction of the groove depth, in direction of the groove, or in direction of the movement.

A machine in accordance with the invention consists of several electric pole units, the number of phases of each said electric pole unit corresponding to a fraction of the number of phases of the machine. These preferably single-phase or two-phase electric pole units are arranged successively either in direction of the groove depth, in direction of the groove or in direction of the groove width and possess conductor lanes of a rectangular cross section. The conductors run in meander shaped layers and partial areas within soft-magnetic bodies, said layers and partial areas progressing parallel to the air gap and perpendicular to the direction of movement. In the direction of movement, or in the direction of the groove width respectively, the electric pole units possess several poles of alternating polarity with the pole pitch within one electric pole unit being constant. The associated rotor or stator possesses this pole pitch over its entire circumference (or its length, respectively). The number of phases of the machine compared to the number of phases of the electric pole units is multiplied by arranging rigidly connected electric pole units which are offset against each other by a fraction of a pole pitch with reference to the rotor poles of the machine.

In an advantageous embodiment a multi-phase electric machine consists of identical single-phase electric pole units, the number of said electric pole units corresponding to the number of phases or a whole number multiple of it. In this configuration the conductor insulation needs to be designed for only a fraction of the terminal voltage. In machines with a plane air gap the entire conductor assembly consists of only two disk-shaped structural conductor designs. The grooved soft-magnetic body can be produced as a single unit or assembled from one structural tooth segment shape and two yoke segment shapes. Including the groove wedges each electric pole unit consists then only of six simple parts which, based on their large number of units, can be produced cost-effectively in an automated production facility.

In machines with an even number of phases it is advantageous to coordinate two electric pole units which are offset against each other by one half pole pitch with one rotor disk, and the number of rotor disks corresponds to one half the number of phases. A three-phase machine can, however, also be constructed from three rotor disks and six electric pole units.

Larger, rotating machines, on the other hand, are separated into several identical sector-shaped electrical pole units, in which case the interfacing grooves are of a design that is wider by a fraction of a pole pitch. By this symmetrical segmentation of the machine into identical electric pole units production and handling of the entire machine is also simplified.

The drawings present advantageous embodiments of the invention.

BRIEF DESCRIPTION OF THE DRAWINGS

FIG. 2 shows the lateral view in accordance with section A—A through the thirty-pole disk armature from FIG. 1;

FIG. 3 shows the lateral view in accordance with section B—B through the thirty-pole disk armature from FIG. 1;

FIG. 4 shows the lateral view in accordance with section C—C through the thirty-pole disk armature from FIG. 1;

FIG. 5 shows the lateral view in accordance with section D—D through the thirty-pole disk armature from FIG. 1;

FIG. 6 shows the lateral view in accordance with section E—E through the thirty-pole disk armature from FIG. 1;

FIG. 7 shows the lateral view in accordance with section F—F through the thirty-pole disk armature from FIG. 1;

FIGS. 11–15 show five structural designs of four-phase linear motors;

DETAILED DESCRIPTION OF THE PREFERRED EMBODIMENT

Figure 1:
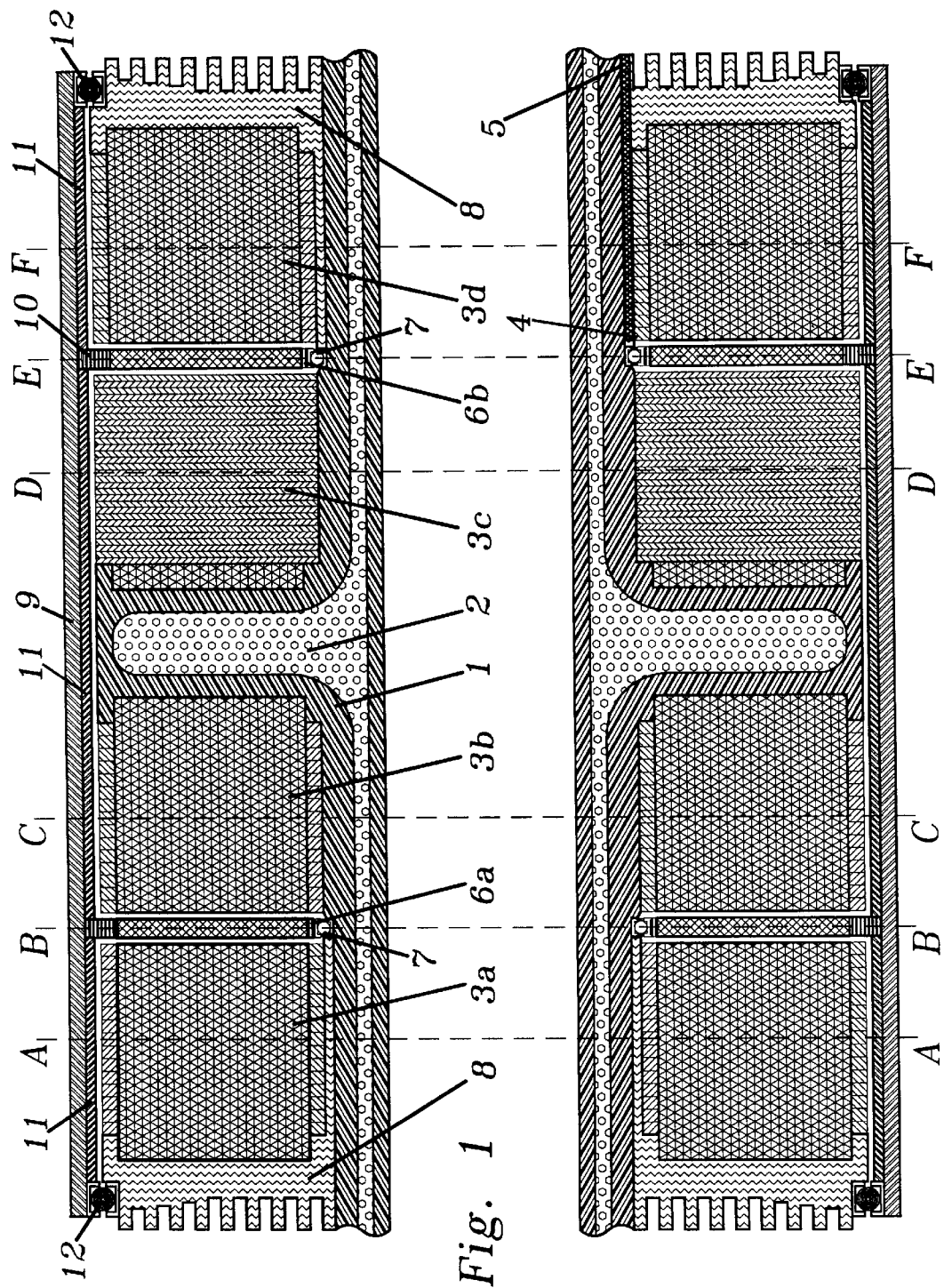
FIG. 1 shows a longitudinal section of a four-phase disk armature with external rotor design.

FIG. 1 shows a longitudinal section of a four-phase disk armature with external rotor design. The internal carrier body (1) contains a hollow space through which a coolant (2) is circulating. In the assembly, first the two inner prefabricated electric pole units (3b, 3c) are pressed on in axial direction. This step ensures the tangential offset of one quarter pole pitch each by the current supply and current derivation (4) which runs in insulated grooves (5) of the inner carrier body (1) in axial direction to the outside. Subsequently, the two identical rotor disks (6a, 6b) together with their inner bearings (7) and the two outer electric pole units (3a, 3d) with their cooling bodies (8) are pressed on in axial direction. During the axial sliding on of the tube shaped jacket shell (9) the prominences (10) of the rotor disks and the spacer bars (11) ensure a frictional connection that is free from play and exact positioning of the rotor disks. In a final step, the two outer bearings are pressed on.

FIG. 2 shows the lateral view in accordance with section A—A through the thirty-pole disk armature from FIG. 1 with the hatching patterns being retained.

FIG. 3 shows the lateral view in accordance with section B—B through the thirty-pole disk armature from FIG. 1 with the hatching patterns being retained.

FIG. 4 shows the lateral view in accordance with section C—C through the thirty-pole disk armature from FIG. 1 with the hatching patterns being retained.

FIG. 5 shows the lateral view in accordance with section D—D through the thirty-pole disk armature from FIG. 1 with the hatching patterns being retained.

FIG. 6 shows the lateral view in accordance with section E—E through the thirty-pole disk armature from FIG. 1 with the hatching patterns being retained.

FIG. 7 shows the lateral view in accordance with section F—F through the thirty-pole disk armature from FIG. 1 with the hatching patterns being retained.

In FIGS. 2–7 the four identical electric pole units (3a–3d) are rotated by a fraction of a pole pitch in relation to the two coincidentally arranged rotor disks (6a, 6b). The electric pole units (3a, 3b) and (3c, 3d) respectively associated with a rotor disk are rotated in relation to each other by one half pole pitch. The rotation between the two groups amounts to one quarter pole pitch. The complete conductor assembly consists of two conductor layers (13a, 13b) which are stacked on top of each other alternatingly offset by one pole pitch. They are distinguishable by different hatching angles and hatching densities, while the soft-magnetic body (14) has concentric circular hatching. The conductor layer (13a) is visible only in the two winding overhangs (15) where it utilizes the recesses in the conductor layer (13a) to double its height. The current passes in each conductor layer (13a, 13b) in a meander pattern through the entire circumference of the machine minus one pole pitch. In this gap occurs either the current supply and current derivation (4) for the drive or the transition to a conductor layer which lies adjacent in the direction of the groove depth. The rotor disks (6a, 6b) can be assembled pole pitch by pole pitch with the soft or hard-magnetic segments being fixed in non-magnetic mountings.

Figure 8:
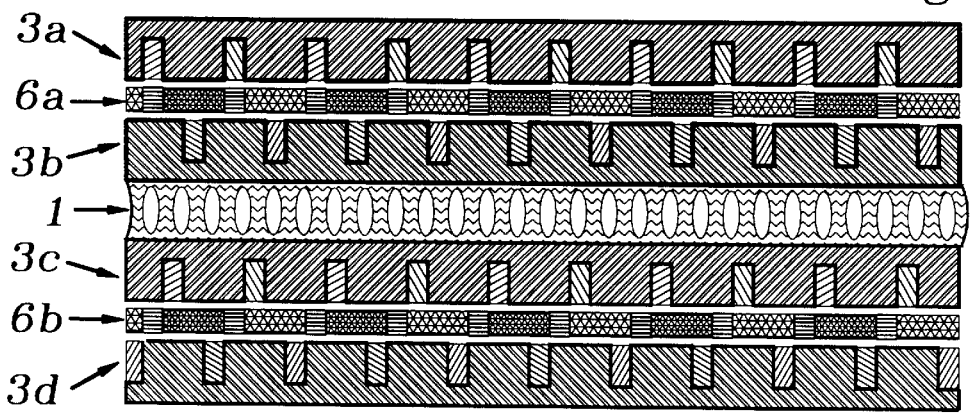
FIGS. 8–10 show three tangential sections through the active parts of four-phase machines.
Figure 9:
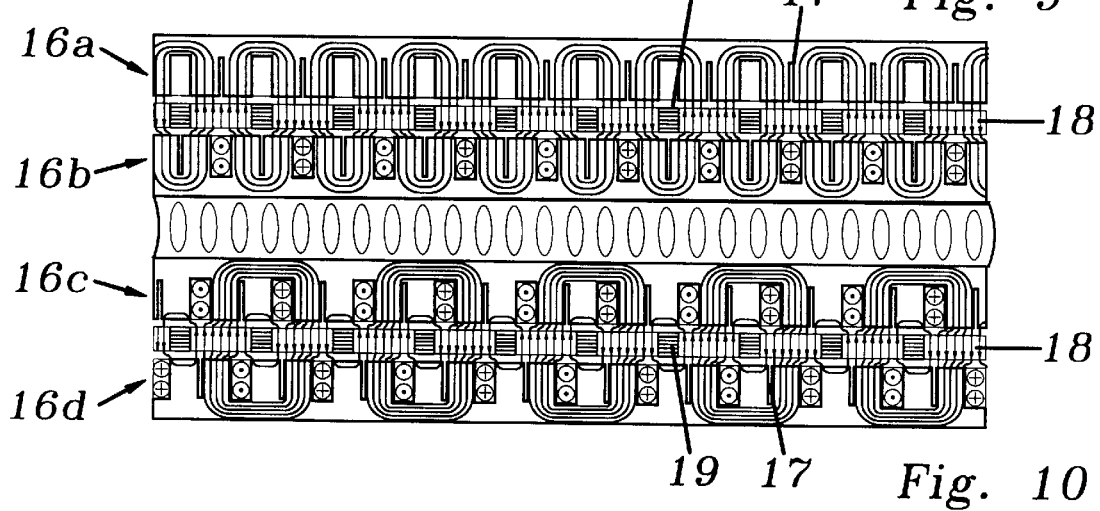
Figure 10:
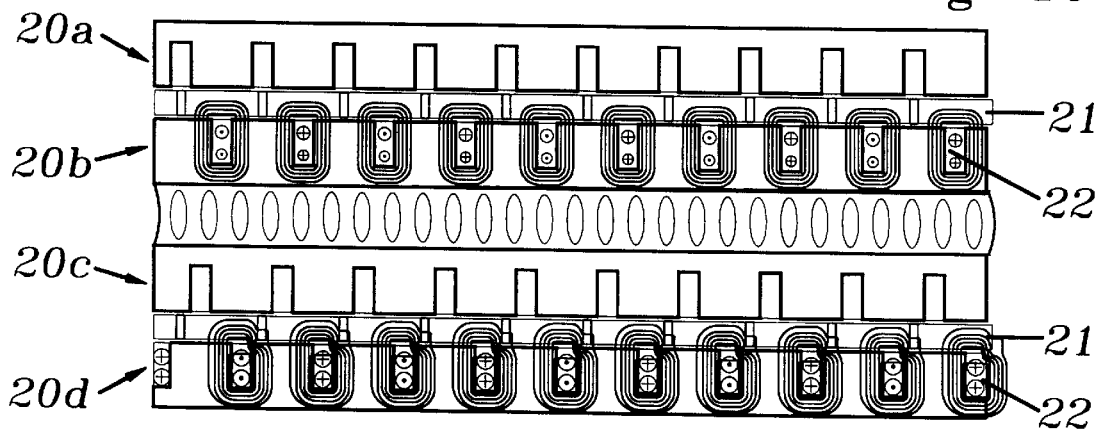

The three tangential sections through a linearized four-phase machine illustrated in FIGS. 8–10 show the tangential offset of the electric pole units and the progression of the magnetic flux in hard and soft-magnetic segments respectively.

FIG. 8 shows a sector comprising 10 pole pitches in which, analogous to FIGS. 1 and 2–7, the hatching and the reference numbers have been retained but the groove depth has been reduced.

In FIG. 9 the field progression of a permanent magnet electric machine without consideration of the magnetic field of the winding is shown. The advantageous current flow direction for this rotor position is depicted by two circular symbols each in the grooves in which a point within a circle symbolizes the current flowing towards the viewer and a cross within a circle symbolizes the current flowing away from the viewer. In order to guide the magnetic flux, slots are added in the tangential center of the teeth of the soft-magnetic body (17). The grooves of the electric pole unit (16a) lie opposite the rotor pole recess. The corresponding phase is in the process of commutation and therefore depicted as currentless. On the other hand, electric pole unit (16b) can develop its full torque. The electric pole units (16c) and (16d) which are also rotated by one half pole pitch in relation to each other can make a positive contribution to the desired torque as well. The right rotating rotor disk consists of axially magnetized rare earth magnets (18) which are fixed in their position by a fiber-reinforced mounting (19).

In FIG. 10 the progression of the magnetic field is shown in a four-phase reluctance machine. The electric pole units (20a–20d) are always energized when by a movement of the soft-magnetic segments (21) towards the right the magnetic resistance for the magnetic field is decreased. In the rotor position shown in the bottom drawing of FIG. 3 the field generated in electric pole unit (20b) has reached its lowest magnetic resistance and the current that was flowing up to this moment in the conductors (22) is now disconnected. The magnetic field in electric pole unit (20d) now generates a force which moves the rotor in the direction to the right. Such reluctance machines can also be utilized as stepping motors.

In FIGS. 11–15 five arrangements of electric pole units in four-phase linear motors are shown.

FIG. 11 shows a simple structural design of a four-phase linear motor in which the four electric pole units (23a–23d) are arranged sequentially in the running direction. The spacing (24) between the identical electric pole units is one quarter pole pitch. The spacing can be perceived from the yokes (25). The grooved stator bar (26) which consists of soft-magnetic material is integrated into the guide bar over its total length. The movable part (27) which is normally firmly connected with the electric pole units is shown shifted upwards in order to better clarify the three-dimensional arrangement.

FIG. 12 shows an embodiment in which the movable part (29) possesses fourteen hard-magnetic segments (28) in order to cover four three-pole electric pole units (30) which in turn show a distance between each other of one quarter pole pitch and in which individual electric pole units are supplied with current only, if they are at least in part energized by the permanent field.

For movable parts which are shorter in the direction of movement the electric pole units (31)—as shown in FIG. 13—are arranged side by side perpendicular to the running direction or in the direction of the grooves respectively.

If a movable part with small overall lengthwise as well as crosswise dimensions is desired, the arrangement shown in FIG. 14 is recommended in which the electric pole units (32) are arranged sequentially in the direction of the groove depth. The active parts of the movable part or the stator (33) protrude skid-like between two respective electric pole units which are offset against each other.

FIG. 15 shows an arrangement with a movable part (35) which is, in relation to the electric pole units (34), very large. The active parts are arranged laterally on the segment bars (36) which reach horizontally into the movable part. In order to compensate the torque, two respective electric pole units of the same phase are arranged in diagonally opposite corners of the movable part.

Figure 16:
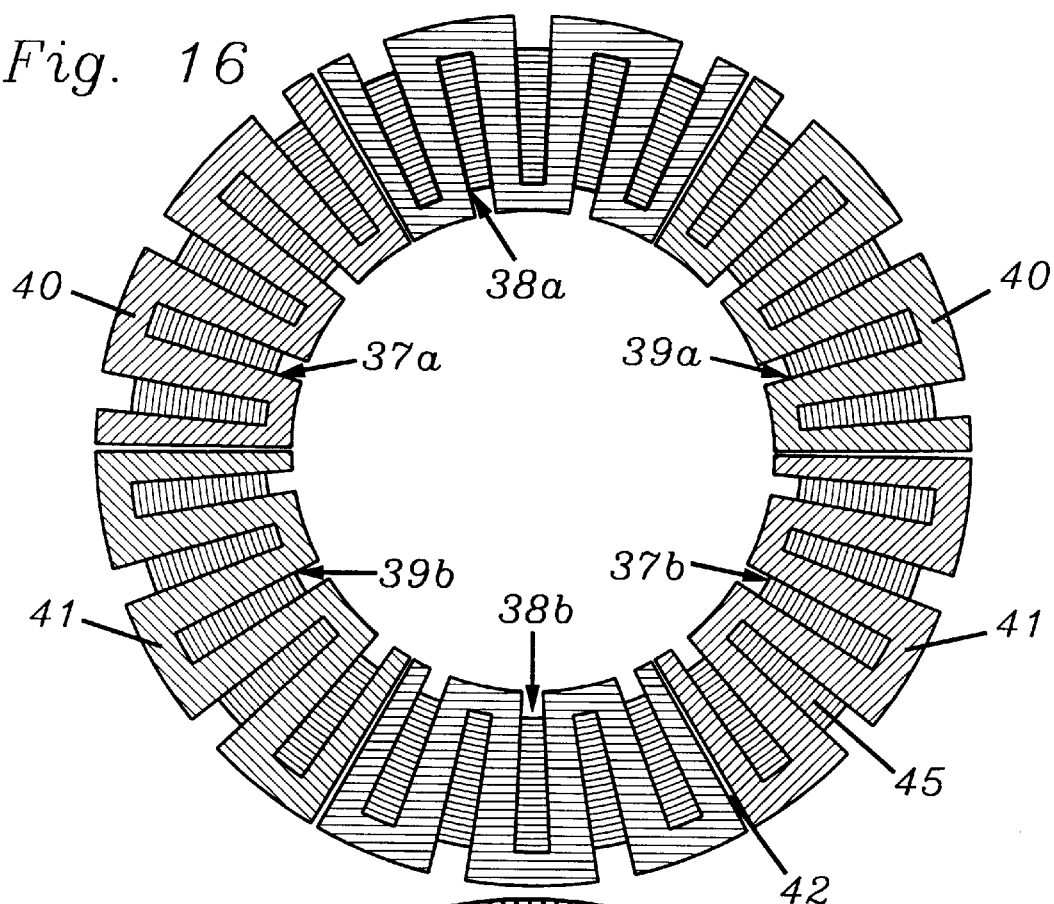
FIG. 16 shows a longitudinal section through the grooved stator of a three-phase disk armature with six five-pole sectors.

Of the six identical sectors (37a) to (39b) which are shown in FIG. 16 two respective sectors that lie opposite to each other belong to one phase. The conductor stacks consist of two stamped parts (40, 41) which are alternately stacked on top of each other. In the widened interfacing groove (42) the conductors of differing phases are separated by a thicker insulating layer. The distance of the radial center lines of the rim teeth of adjacent sectors amounts to four thirds of the normal pole pitch which, on the other hand, corresponds to the pole pitch of the movable part.

Figure 17:
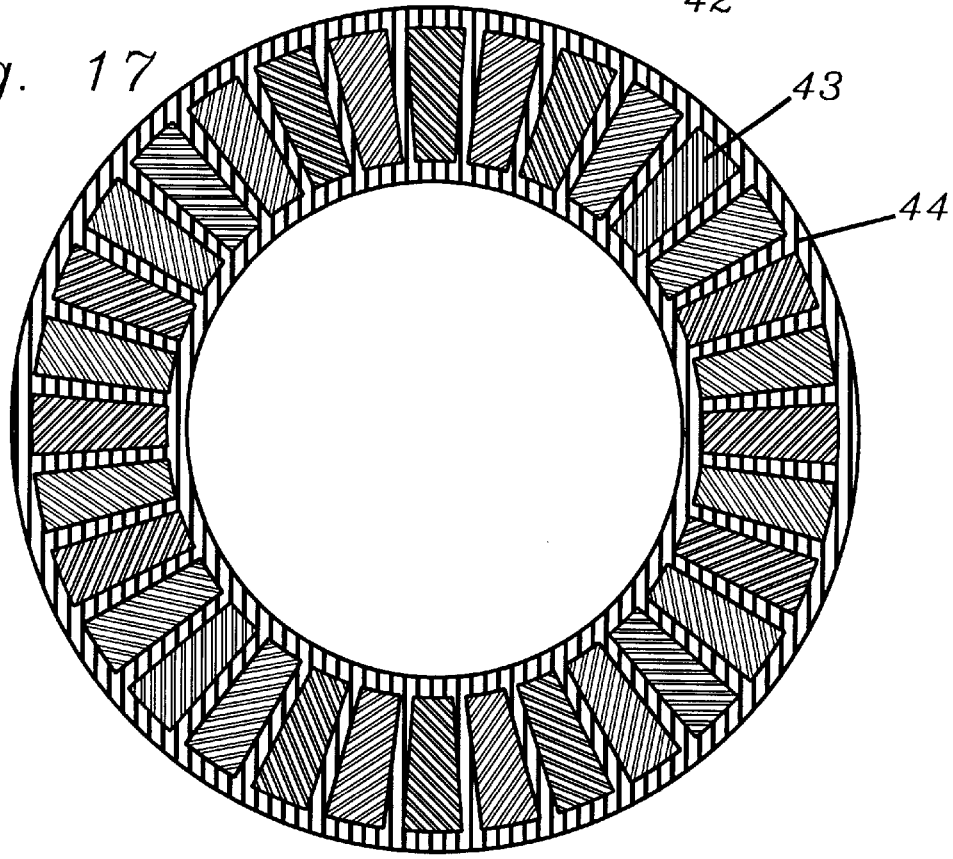
FIG. 17 shows a longitudinal section through the 32-pole rotor with permanent magnets belonging to the disk armature from FIG. 1.

While the rotor, as shown in FIG. 17, is constructed symmetrically of thirty-two identical magnetic poles (43) which are embedded in a plastic body (44), the stator possesses six broader interfacing grooves (42) in order to generate differing phases and only thirty poles (45).

FIGS. 18–21 show the assembly of a four-pole sector for a linear motor. The depicted structural design—curved around various axes—is also applicable in axial and radial air gap machines.

Figure 18:
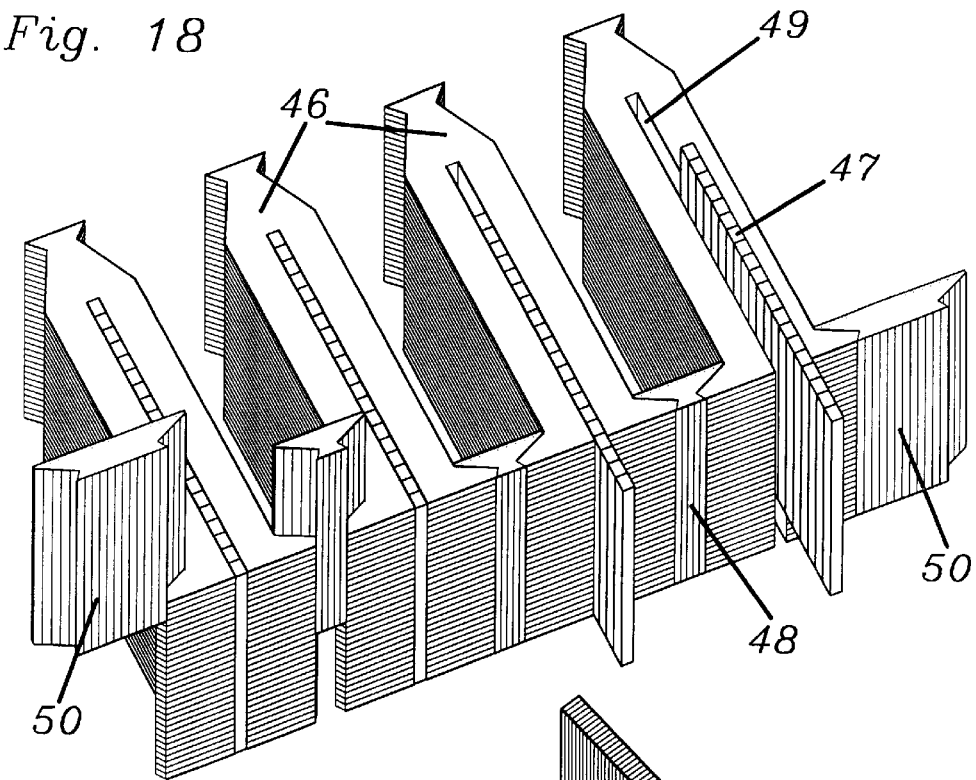
FIG. 18 shows the assembly of the tooth segments and groove wedges for a four-pole sector of a linear motor.

In the assembly of the sectors, as shown in FIG. 18, the tooth segments (46) with insulating plates (47) and elastic groove wedges (48) are joined first in their final position. The insulating plates fill the narrow flux guiding grooves (49) in the center of the tooth segments and the groove wedges ensure the spacing between the tooth segments and avoid air noise. Wider groove wedges (50) are required for the wider interfacing grooves.

Figure 19:
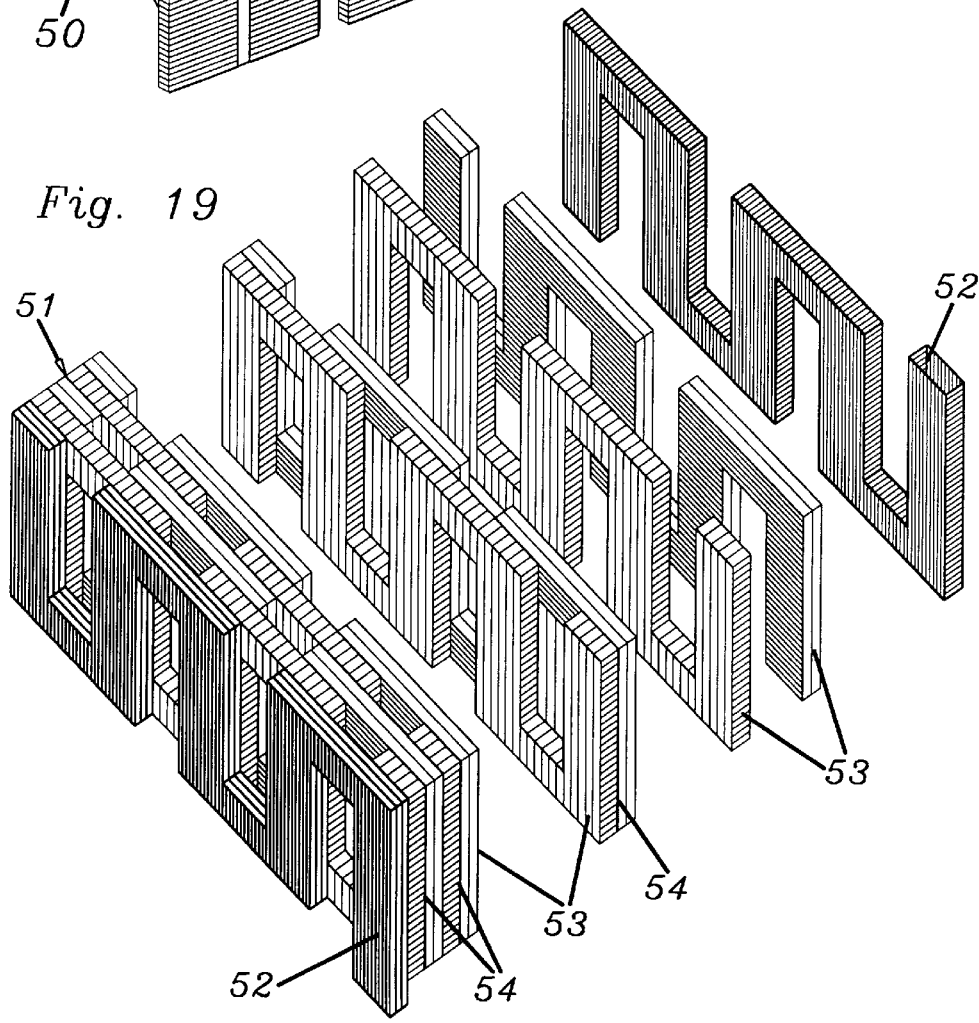
FIG. 19 shows the assembly of a ten-layer conductor stack for the sector from FIG. 18.

In FIG. 19 the assembly of a ten-layer conductor stack (51) for the four-pole sector from FIG. 18 is depicted. The five conductor parts on the left already constitute a compact stack, while the remaining five conductor parts are added in pairs or singly. Each conductor stack of the multi-phase linear motor consists of two stamped structural conductor designs, where besides the supply and derivation conductors (52) eight normal conductor layers (53) are inserted. After sliding the conductor layers together, they are welded together at the interface edges (54).

Figure 20:
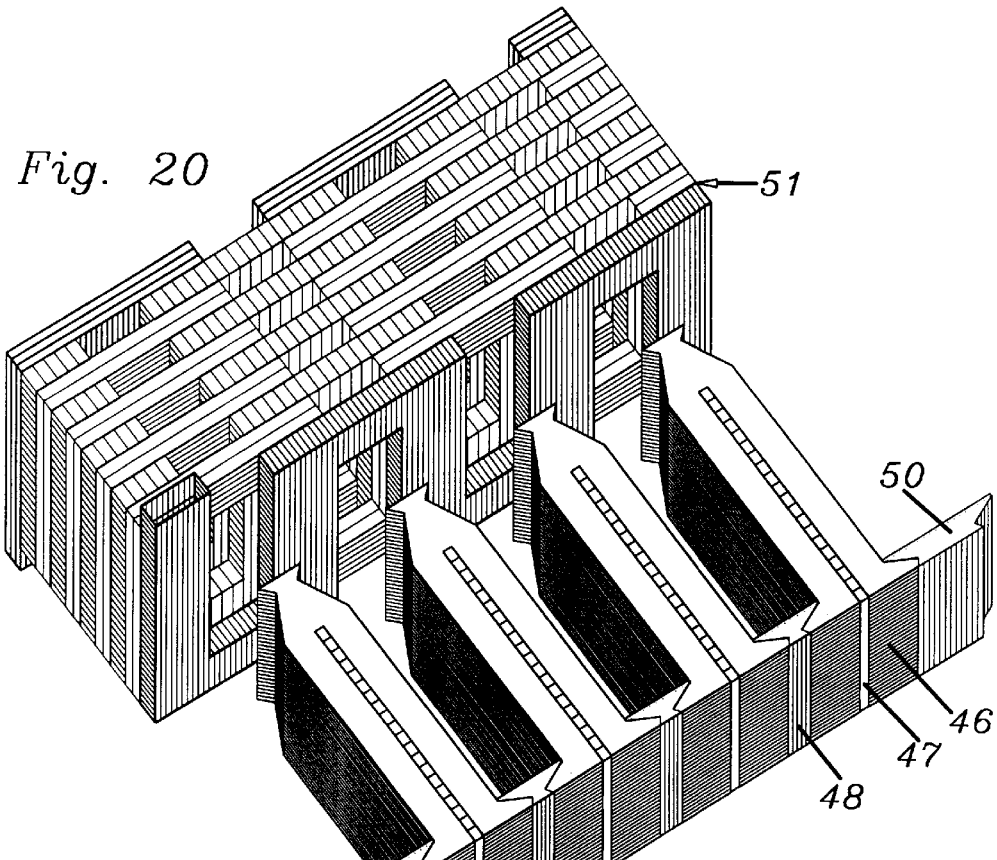
FIG. 20 shows how the conductor stack from FIG. 19 is slid onto the teeth from FIG. 18.

In FIG. 20, the functional conductor stack (51) is pushed onto the tooth segments (46).

Figure 21:
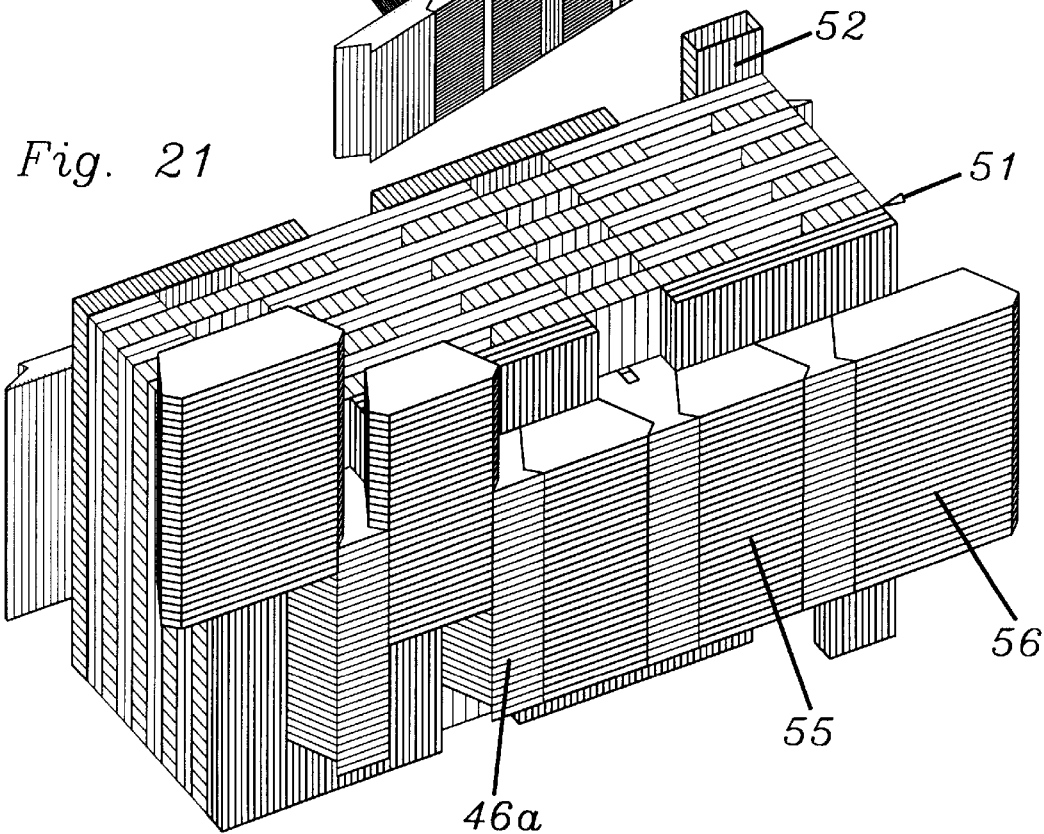
FIG. 21 shows how the assembled four-pole sector is stabilized by sliding in of the yoke segments.

Finally, as shown in FIG. 21, the yoke segments (55, 56) are inserted in direction of the groove into the tooth segment ends (46a) which protrude from the conductor stack (51) causing the conductor stack to be pushed against the elastic groove wedges (48, 50) and achieving an assembly that is free from play and which can be disassembled at any time again. Besides the normal yoke segments (55) wider yoke segments (56) are required for the interface grooves to the adjacent identical sectors of other phases which, as, an alternative to the normal multi-layer yoke segments, may consist of ferrite.

Alternatively to the prefabricated non-curved conductor lanes, the partition of the multi-phase machine into single-phase electric pole units can also be executed advantageously by profiled conductors, since the conductor progression of said electric pole units is non-intersecting.

Figure 22:
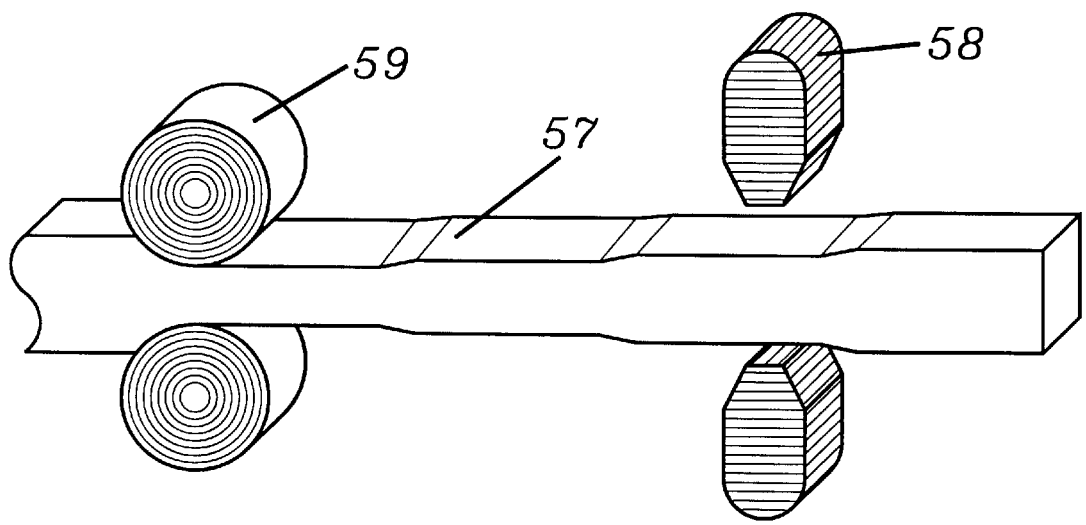
FIG. 22 shows a profiled conductor with variable cross section for a radial air gap machine.

In FIG. 22 a rectangular profiled conductor (57) for a radial air gap machine is shown, whose conductor cross section is altered over predetermined longitudinal sections by a preprogrammed rolling machine (59) prior to application of the insulating material in a coating facility (58). The longitudinal sections with constant cross section correspond to the conductor lengths of the layers which lie parallel to the air gap, thereby changing the width of the conductor in proportion to the radius at each transition to another layer.

Figure 23:
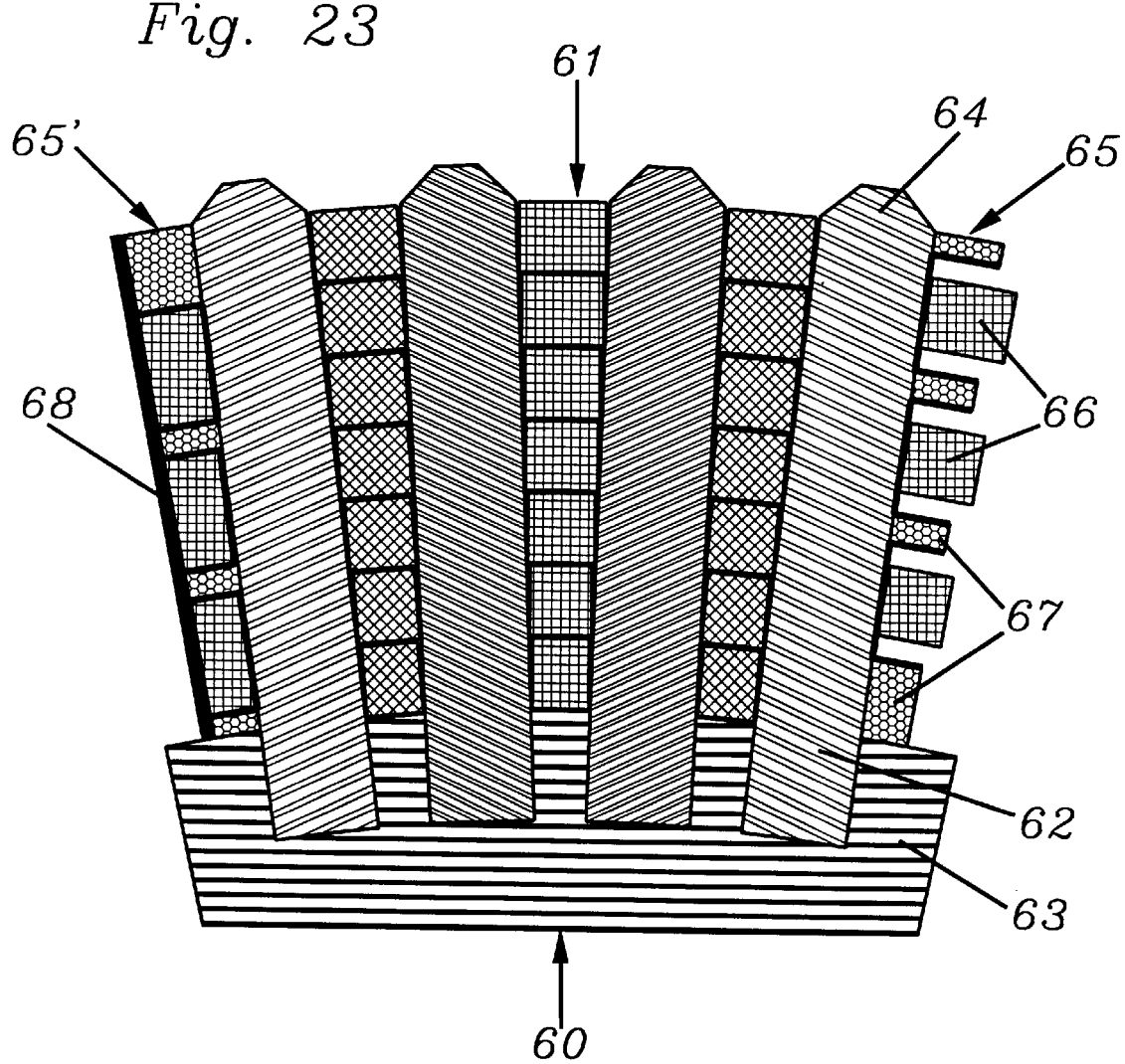
FIG. 23 shows a longitudinal section through a device for the preassembly of a four-pole sector winding of a radial air gap machine with a profile conductor.

FIG. 23 shows a device (60) in which a self-contained four-pole sector winding (61) for a radial air gap machine is prefabricated. The parts of the device (62) corresponding to the teeth are inserted into a base body (63) and possess conically tapered ends (64) in order to facilitate the insertion of the conductor. In the wider interface grooves (65) the inclined partial lengths of the conductor lane (66) are inserted into alignment bodies (67) which consist of an insulating high-strength plastic. After radial pulling out of the tooth parts (62) and prior to removing the prefabricated sector winding (61), said winding being rendered self-contained by a binding agent, together with the groove insulation from the device (60) the partial conductor lengths in the interfacing grooves (65) are once more deformed by pressing them tangentially into the solid alignment bodies (67). The illustration shows the partial conductor lengths already pressed together in the left interfacing groove (65') and not yet pressed together in the right interfacing groove (65). By tangential combining of the sector windings (61) which are only separated by thin insulating plates (68) the complete winding of the multi-phase machine is achieved.

I claim:

1. A multi-phase electric machine comprising at least one stator and one moving part, said stator being separated from the moving part by an air gap, said stator or said moving part containing at least one soft-magnetic body with grooves, said grooves having a width, a depth, and a length, and located between said grooves are poles where the distance of the central line of adjacent poles is one pole pitch, and arranged in said grooves are conductor lanes and in said soft-magnetic body can flow a magnetic flux, wherein the machine contains at least two multi-polar electric pole unit (3, 16, 20, 37a–39b), the number of phases of said units being smaller than the number of phases of the entire machine, the poles (45) of the electric pole units (37*a*–39*b*) show alternating polarity in the direction of movement of the moving part, the magnetic flux flows in the electric pole units (3*a*–3*d*) through soft-magnetic material, the conductor lanes (13, 22, 61) progress in layers (40, 41, 53) parallel to the air gap and in meander pattern in the direction of movement of the moving part over the entire length of the respective electric pole units (3, 37*a*–39*b*), the conductors (40, 41, 66) are of a rectangular cross section within the electric pole units, the pole pitch within each electric pole unit (3,37*a*–39*b*) is constant, the pole pitch of the moving part or stator (6, 18, 21) is constant over the entire circumference or length of the machine, said moving part or stator lying opposite the electric pole units (3, 16, 20) at the air gap, some of the rigidly connected electric pole units (16*a*–16*d*, 20*a*–20*d*) are offset by a fraction of a pole pitch against each other with reference to the moving part or stator poles (18, 21) which lie opposite said electric pole units, the electric pole units (30, 31, 32) are arranged successively in either the direction of the groove depth, in direction to the groove or in direction of the movement of the moving part.

2. A multi-phase electric machine as recited in claim 1, the moving part thereof being a rotor, said rotor possessing an axial or radial air gap and rotating in front of the stator, wherein the electric pole units (37*a*–39*b*) are designed as sectors of the machine circumference the conductor lanes (40, 41, 66) progress only through a fraction of the machine circumference interfacing grooves lie between two adjacent units (42, 65) and the width of said interfacing grooves between two tangentially adjacent sectors of electric pole units (37*a*–39*b*) is larger by a fraction of a pole pitch than the width of the other grooves within a sector.

3. A multi-phase electric machine as recited in claim 1, wherein the number of electric pole units (3, 37*a*–39*b*) of said machine corresponds to the number of phases of said machine, or a whole-number multiple of the number of phases respectively, and wherein all electric pole units are of a single-phase and identical design.

4. A multi-phase electric machine as recited in claim 1, wherein conductor lanes (13*a*, 13*b*) which lie on top of each other, being separated only by thin insulating layers, and said conductor lanes, offset against each other by one pole pitch, progress in direction of the groove width, said conductor lanes lying directly adjacent to the magnetic body (14), and said conductor lanes, in partial areas that progess outside said grooves in direction of the groove width are enlarged in relation to the remaining partial areas in direction of the groove depth.

5. A multi-phase electric machine as recited in claim 1, wherein two identical electric pole units (3, 34) are arranged on opposite sides of a rotor (6) or stator (36), said electric pole units being offset against each other by one half pole pitch in direction to the groove width.

6. A multi-phase electric machine as recited in claim 1, wherein additional identically designed electric pole units (3, 34) are intended to move the same moveable structural part and in which the moving parts (6, 35) are firmly connected with said movable structural parts, and wherein said electric pole units (3, 34) are offset with reference to the poles of the moving parts by the respective fraction of a pole pitch which corresonds to the number of phases, and wherein a coolant (2) is circulating between two electric pole units (3*b*, 3*c*).

7. A multi-phase electric machine, comprising at least one stator and one moving part, said stator being separated from said moving part by an air gap, said stator or said moving part containing at least one soft-magnetic body with grooves, said grooves having a width, a depth, and a length, and located between said grooves are poles and arranged in said grooves is a prefabricated rectangular-shaped profiled conductor which is coated with insulation material, said conductor having variable conductor cross sections and being desigend in meander-shaped layers and said layers and said soft-magnetic body constituting a single-phase, multi-pole electric pole unit, and the machine is consisting of several such electric pole units.

8. A multi-phase electric machine as recited in claim 7, wherein the conductors have longitudinal sections with constant cross sections, said longitudinal sections corresponding to the conductor lengths of the layer which lie parallel to the air gap and wherein the width of the conductor cross section changes in proportion to the radius at each transition to another layer.

* * * * *